United States Patent
Coe

(10) Patent No.: US 6,270,128 B1
(45) Date of Patent: Aug. 7, 2001

(54) METHOD OF ATTACHING A SOFT LINK FOR CONNECTING A GROUP OF PARACHUTE SUSPENSION LINES TO HARNESS VIA RISERS

(75) Inventor: Bill J. Coe, Deland, FL (US)

(73) Assignee: P.D. of Miami, Inc., Deland, FL (US)

( * ) Notice: Subject to any disclaimer, the term of this patent is extended or adjusted under 35 U.S.C. 154(b) by 0 days.

(21) Appl. No.: 09/492,554

(22) Filed: Jan. 27, 2000

(51) Int. Cl.⁷ .................................................. B65H 69/04
(52) U.S. Cl. ........................ 289/1.5; 244/151 R; 244/152
(58) Field of Search .......................... 244/151 A, 151 R; 289/1.5, 17, 18.1

(56) References Cited

U.S. PATENT DOCUMENTS 4,099,750 * 7/1978 McGrew .............................. 289/1.5
5,062,344 * 11/1991 Gerker ..................................... 87/8

* cited by examiner

Primary Examiner—Charles T. Jordan
Assistant Examiner—George L Steele
(74) Attorney, Agent, or Firm—Malin, Haley & DiMaggio, P.A.

(57) ABSTRACT

A soft connector link is disclosed for connecting a first item to a second item such as canopy suspension lines to a canopy riser. In a first embodiment, the soft link preferably includes a flexible body member having a first looped end and a second looped end. A tab member is preferably attached or secured to the second looped end. The soft link is preferably constructed from a rope-like material such as high strength fiber. In an alternative embodiment, the second end of the body member is tabbed or lumped, as opposed to being looped. Two attachment methods for using the soft link as a connector are also disclosed and illustrated.

11 Claims, 2 Drawing Sheets

METHOD OF ATTACHING A SOFT LINK FOR CONNECTING A GROUP OF PARACHUTE SUSPENSION LINES TO HARNESS VIA RISERS

BACKGROUND OF THE INVENTION

1. Field of the Invention

This invention relates generally to parachutes, and more particularly to a connector link used for connecting groups of parachute suspension lines to the harness via risers, as well as attaching bridle cords to canopies, such as pilot chutes.

2. Description of the Related Art

Links for connecting suspension lines to the harness via risers and bridle cords to canopies are known in the industry. Prior to links the suspension lines were sewn directly to the risers. Typically, these links require tools to install or remove the links. Often the links also required sewing to install and have knots that can slip. Conventional links also commonly use metal hardware. When using prior art links, the riser often is modified to install a snap thereon. Where the links are sewn on, they cannot be reused. Furthermore, the use of metal hardware increases the wear and tear of the connector link, and also increases the weight of the link. Additionally, the use of metal links increases the cost of the connector link. The use of metal links also causes bumps in parachute containers and riser covers and often requires a device that protects the grommets of the slider from being damaged. Accordingly what is needed in the art is a connector link for connecting a first item to a second item, such as groups of parachute suspension lines to a riser, which requires no sewing, metal hardware and which is reusable. It is therefore to the effect a resolution of the shortcomings of the prior art, that the present invention is directed.

BRIEF SUMMARY OF THE INVENTION

The present invention provides a connector link for primarily connecting a group of parachute suspension lines to a harness riser, as well as attaching bridle cords to the canopy (pilot chute). However, the invention is not limited to such uses and can be also used outside the parachute industry for connecting a first item or member to a second item or member, respectively. The soft connector links are preferably reusable and require no tools to install or remove. The present invention links also require no sewing to install. Additionally, the links have no knots that can slip, and use no metal hardware.

The links preferably are constructed from a rope-like material and preferably from a fiber material, such as a high strength fiber such as ones offered under the trademarks SPECTRA, VECTRAN and/or KEVLAR. Other materials such as nylon or fabric can also be used and all are considered within the scope of the invention. Preferably, the links include a loop member at each end, to allow the link to be used in either of the attachment methods discussed below. However, where the link is used only with the second attachment method, described below, the link can alternatively include a loop at one end and a lump and/or tab at the opposite end. Where two loops are provided, preferably, one of the loop members is provided with a tab member attached or secured thereto. Preferably, two different methods are used for attaching the suspension lines to the riser. The first method is used for larger risers and includes the following steps:

(i) passing a first end of the link through a loop defined at the end of the suspension lines and passing a second end of the link through a loop disposed at the end of the riser;

(ii) passing the first end of the link through the loop disposed at the end of the riser and then through the suspension lines for a second time;

(iii) passing the first non-tabbed looped end of the link through the loop of the second tabbed end of the link;

(iv) passing the non-looped end over the tab member of the second looped end of the link;

(v) feeding the tab member through the first non-tabbed looped end of the link;

(vi) pulling tight on a portion of the link body member; and (vii) cinching tight the connection point.

The second method is preferably used for smaller risers and as stated above does not require a loop at each end of the body member of the link. The second method includes the following steps:

(i) passing a first end of the link through a loop defined at the end of the suspension lines and passing the second end of the link through a loop disposed at the end of the riser;

(ii) passing the first end of the link through the loop disposed at the end of the riser and then through the suspension lines for a second time;

(iii) inserting a tabbed and/or lumped end through the loop end of the link to create an adjustably sized new non-tabbed looped end;

(iv) inserting the tabbed second end through the new non-tabbed looped end;

(v) pulling tight on the link body member adjacent the new non-tabbed looped end; and (vi) cinching tight at the connection point.

With either method, the present invention provides a soft connector link, which eliminates the need of any metal hardware thus reducing the weight and the cost of the link. Furthermore, the connector link is easier to install as opposed to previous connector links, and does not require any sewing or tools for installation.

Accordingly, it is an object of the invention to provide a soft connector link that requires no tools or sewing for installation.

It is another object of the invention to provide a connector link that is reusable.

It is a further object of the present invention to provide a connector link that uses no metal hardware.

It is even still another object of the invention to provide a connector link that eliminates the need for a protective device to prevent damage to any slider grommets.

It is yet another object of the invention to provide a connector link that eliminates lumps in parachute containers and riser covers.

It is even still a further object of the invention to provide a connector link that is relatively low in cost to manufacture.

It is yet still another object of the invention to provide a connector link that is relatively easy to use.

In accordance with these and other objects which will become apparent hereinafter, the instant invention will now be described with particular reference to the accompanying drawings.

BRIEF DESCRIPTION OF THE SEVERAL VIEWS OF THE DRAWINGS

The invention may be better understood by reference to the drawings in which.

DETAILED DESCRIPTION OF THE INVENTION

Figure 1:
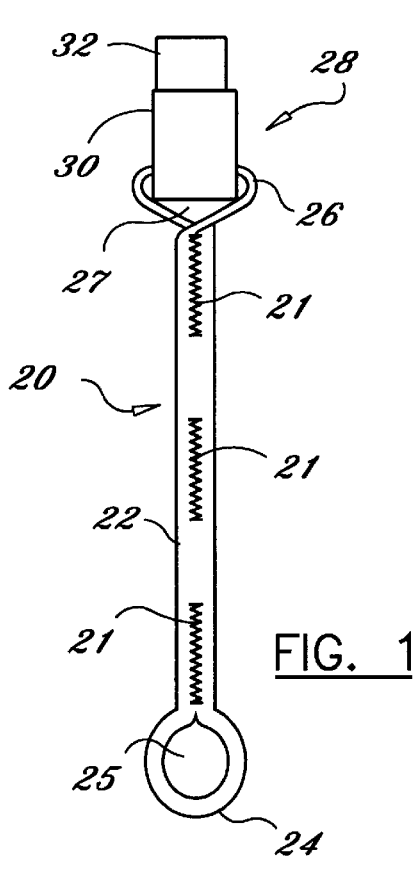
FIG. 1 is a front partial sectional view of the soft connector link in accordance with the present invention.
Figure 2:
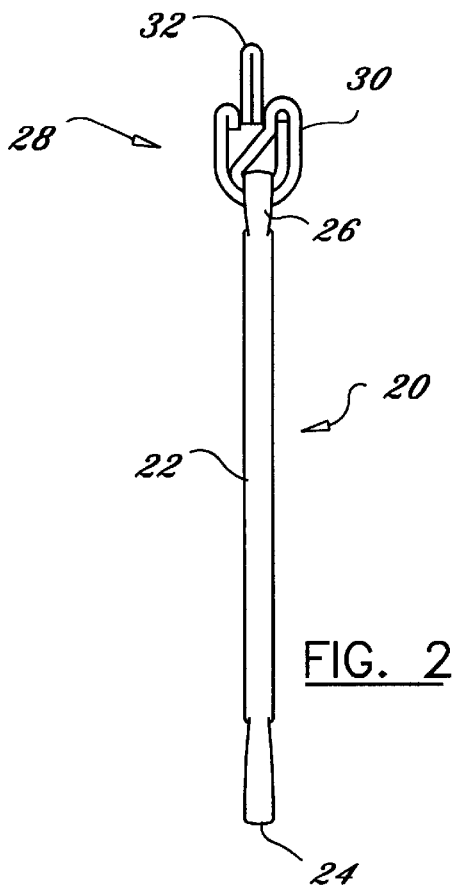
FIG. 2 is a side view of the soft connector link of FIG. 1.

As seen in FIGS. 1 and 2 a soft connector link in accordance with the present invention is illustrated and generally designated soft link 20. In a preferred embodiment, link 20 includes a body member 22, preferably flexible, having a first looped end 24 and second looped end 26. In this embodiment, link 20 can be used with either attachment method described below. In an alternative link embodiment, body member 22 includes one looped end and a lump and/or tab at its opposite end. This alternative link embodiment can be used with the second attachment method described below.

Where two looped ends are provided, a tab member 28 is preferably attached or secured to second looped end 26 by conventional means such as stitching. However, it should be recognized that tab member 28 can be alternatively attached or secured to first looped end 24 by other conventional means. Tab member 28 can consist of two pieces, such as nylon member 30 with bartack thread and label 32. Links 20 preferably are constructed from a rope-like material and preferably from a fiber material, such as a high strength fiber such as ones offered under the trademarks SPECTRA, VECTRAN and/or KEVLAR. Other materials such as nylon or fabric can also be used and all are considered within the scope of the invention. Links 20 can include bartack threads 21.

Figure 3:
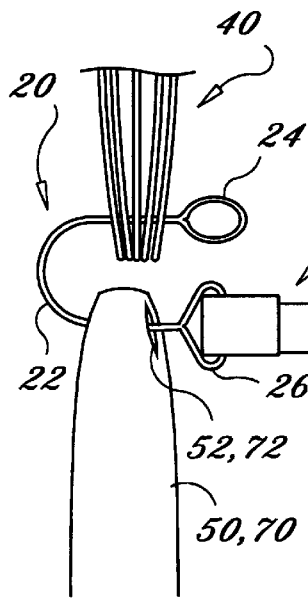
FIGS. 3–5 illustrate the first two steps for using the soft link of FIG. 1 to connect a first item to a second item, such as a group of canopy suspension lines to a harness riser.
Figure 4:
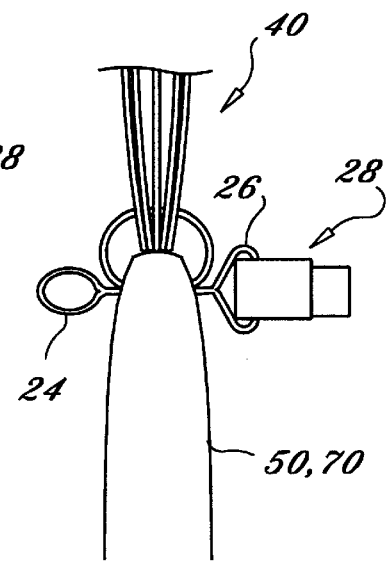
Figure 5:
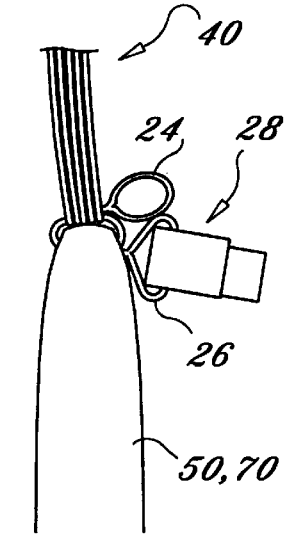
Figure 6:
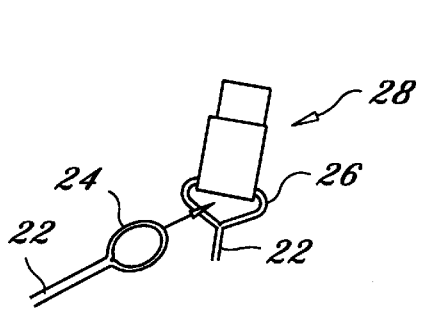
FIGS. 6–10 illustrate the remaining steps for using the soft connector link of FIG. 1 where the first item is a plurality of suspension lines and the second item is a relatively large canopy riser.
Figure 7:
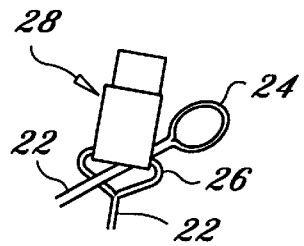
Figure 8:
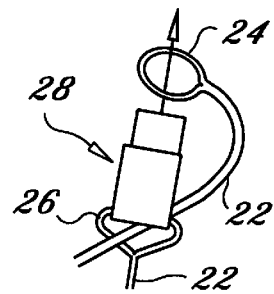
Figure 9:
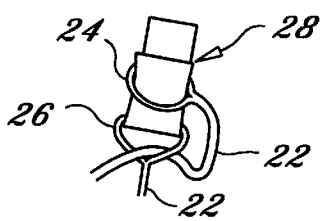
Figure 10:
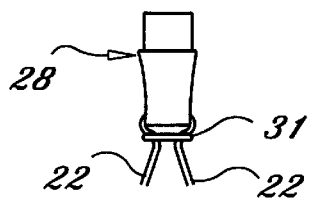
Figure 11:
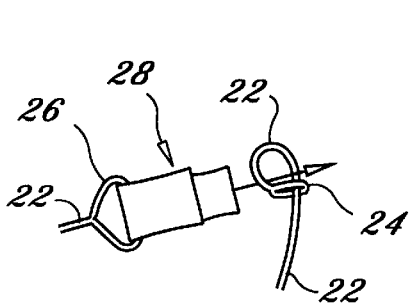
FIGS. 11–13 illustrate the remaining steps for using the soft connector link of FIG. 1 where the first item is a plurality of suspension lines and the second item is a relatively small canopy riser.
Figure 12:
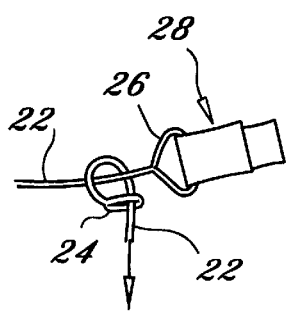
Figure 13:
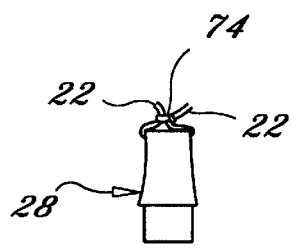

Preferably two different methods are used for attaching one or more suspension lines 40 to a riser via link 20. The first two steps in either method are similar, and are illustrated in FIGS. 3–5. The first method is used for larger risers 50 associated with the harness and includes the following steps:

(i) passing first end 24 of link 20 through a loop 25 defined at the end of one or more suspension lines or group of suspension lines 40 and passing second end 26 of link 20 through loop 52 disposed at the end of riser 50;

(ii) passing first end 24 of link 20 through loop 52 of riser 50 and then through suspension lines 40 for a second time;

(iii) passing first end 24 of link 20 through loop 27 of second end 26 of link 20;

(iv) passing first end 24 over tab member 28 secured to second end 26 of link 20;

(v) feeding tab member 28 through the first end 24 of link 20;

(vi) pulling tight on a portion of link body member 22; and (vii) cinching tight the connection point 31.

The second method is preferably used for smaller risers 70 and as stated above does not require a loop at each end of body member 22 of link 20. The second method includes the following steps:

(i) passing first end 24 of link 20 through a loop defined at the end of one or more or a group of suspension lines 40 and passing second end 26 of link 20 through a loop 72 disposed at the end of riser 70;

(ii) passing first end 24 of link 20 through loop 72 of riser 70 and then through suspension lines 40 for a second time;

(iii) inserting tabbed or lumped end 26 (may also be looped but not required) through looped first end 24 to create an adjustably sized new non-tabbed looped end;

(iv) inserting tabbed/lumped second end 26 through the new non-tabbed looped end;

(v) pulling tight on link body member 22 preferably adjacent the new non-tabbed looped end; and (vi) cinching tight at connection point 74.

Use of soft connector link 20 eliminates the need of any metal hardware, thus reducing the weight and cost link 20 as compared prior art links. Connector link 20 is also easier to install as opposed to previous connector links, and does not require any sewing or tools for installation.

As stated above, soft connector link 20 is for primarily intended for use in the parachute industry for connecting parachute suspension lines to the riser of the canopy harness, as well as attaching the bridle cord to the canopy/pilot chute. However, the invention is not limited to such uses and can be also used outside the parachute industry for connecting a first item or member to a second item or member, respectively. These other uses for connector link 20 are also considered within the scope of the invention. Connector link 20 is preferably reusable and requires no tools to install or remove. Additionally, no sewing is necessary for installation of link 20. Links 20 have no knots that can slip, and use no metal hardware.

The instant invention has been shown and described herein in what is considered to be the most practical and preferred embodiment. It is recognized, however, that departures may be made therefrom within the scope of the invention and that obvious modifications will occur to a person skilled in the art.

What is claimed is:

1. A method for connecting a first member to a second member by a soft link, said first member having a first aperture and said second member having a second aperture, said soft link including a body member having a first looped end and a second looped end and a tab member secured to said second looped end; said method for connecting comprising the following steps:

(i) passing a first end of the link through a first aperture of said first member and passing a second end of the link through a second aperture of said second member;

(ii) passing the first end of the link through the second aperture of said second member and then through the first aperture of said first member for a second time;

(iii) passing the first end of the link through the loop of the second end of the link;

(iv) feeding the tab member through the loop of the first end of the link; and (v) cinching tight the connection point.

2. The soft link of claim 1 wherein said body member is constructed from a rope like material.

3. The soft link of claim 1 wherein the first member is a group of parachute suspension lines and said second member is a riser.

4. The soft link of claim 1 wherein the first member is a bridle cord and the second member is a canopy.

5. The soft link of claim 4 wherein said canopy is a pilot chute.

6. A method for connecting a first member to a second member by a soft link, said first member having a first aperture and said second member having a second aperture, said soft link including a body member having a first looped end and a second tabbed or lumped end; said method for connecting comprising the following steps:
   (i) passing a first end of the link through a first aperture of said first member and passing a second end of the link through a second aperture of said second member;
   (ii) passing the first end of the link through the second aperture of said second member and then through the first aperture of said first member for a second time;
   (iii) inserting the second end of the link through the loop of the first end of the link to create an adjustably sized looped first end;
   (iv) inserting the second end through the adjustably sized looped first end; and
   (v) cinching tight at the connection point.

7. The method for connecting of claim 6 further comprising the step of pulling tight on the link body member adjacent the adjustably sized looped first end prior to step (v).

8. The soft link of claim 6 wherein said body member is constructed from a rope like material.

9. The soft link of claim 6 wherein the first member is a group of parachute suspension lines and said second member is a riser.

10. The soft link of claim 6 wherein the first member is a bridle cord and the second member is a canopy.

11. The soft link of claim 10 wherein said canopy is a pilot chute.

\* \* \* \* \*